United States Patent [19]

York

[11] 4,427,968
[45] Jan. 24, 1984

[54] DISTRIBUTION NETWORK COMMUNICATION SYSTEM WITH FLEXIBLE MESSAGE ROUTES

[75] Inventor: Theodore H. York, Raleigh, N.C.

[73] Assignee: Westinghouse Electric Corp., Pittsburgh, Pa.

[21] Appl. No.: 252,682

[22] Filed: Apr. 9, 1981

[51] Int. Cl.³ .............................................. H04B 3/54
[52] U.S. Cl. ........................... 340/310 R; 340/825.02; 455/15
[58] Field of Search .......... 340/310 R, 310 A, 825.02, 340/825.52; 455/14–16; 179/170 R; 375/3

[56] References Cited

U.S. PATENT DOCUMENTS

| | | |
|---|---|---|
| 3,484,694 | 12/1969 | Brothman et al. |
| 3,693,155 | 9/1972 | Crafton et al. ..................... 340/310 |
| 3,846,703 | 11/1974 | Stewart et al. |
| 3,854,122 | 12/1974 | Cross |
| 3,899,774 | 8/1975 | Binnie et al. |
| 3,911,415 | 10/1975 | Whyte ........................... 340/310 A |
| 3,925,763 | 12/1975 | Wadhwami et al. ............... 340/310 |
| 3,942,168 | 3/1976 | Whyte ............................. 340/310 R |
| 3,967,264 | 6/1976 | Whyte et al. ................... 340/310 A |
| 3,973,240 | 8/1976 | Fong ............................... 340/310 A |
| 4,130,874 | 12/1978 | Pai .................................... 364/514 |
| 4,210,901 | 7/1980 | Whyte et al. ................... 340/310 R |
| 4,225,939 | 9/1980 | Yashiro ............................... 364/900 |
| 4,228,422 | 10/1980 | Perry ............................. 340/310 A |
| 4,250,489 | 2/1981 | Dudash et al. ................. 340/310 A |

Primary Examiner—James J. Groody

[57] ABSTRACT

Each customer location is equipped with a remote terminal which contains a role code identifying the remote terminal as an end device and a plurality of address codes. A plurality of signal repeaters are each connected with certain of the remote terminals through a distribution network. Each signal repeater contains stored route and role codes as well as a unique address code allowing each signal repeater to be additionally addressed as an end device. A central station produces an outgoing communication signal intended for at least one end device. A communication link couples the central station to the power distribution network. The communication signal includes a route code identifying a signal path to the end device, a role code identifying the first device in the identified route, an address code and a message code. Upon receipt of the communication signal by a signal repeater which is not the intended end device, the received route and role codes are compared to the stored route and role codes. If there is a match, the signal repeater removes its role code from the communication signal, inserts the role code of the next device in the identified route and retransmits the signal. The signal is continually modified and retransmitted until the message code is received by the intended end device.

11 Claims, 4 Drawing Figures

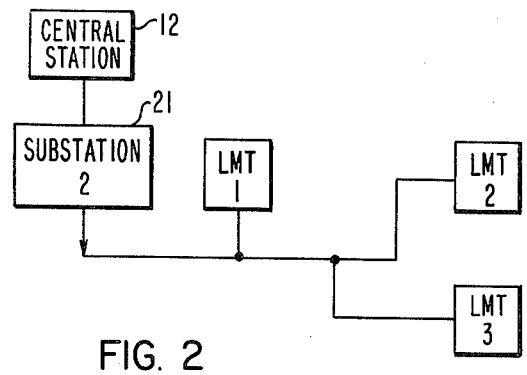
FIG. 2
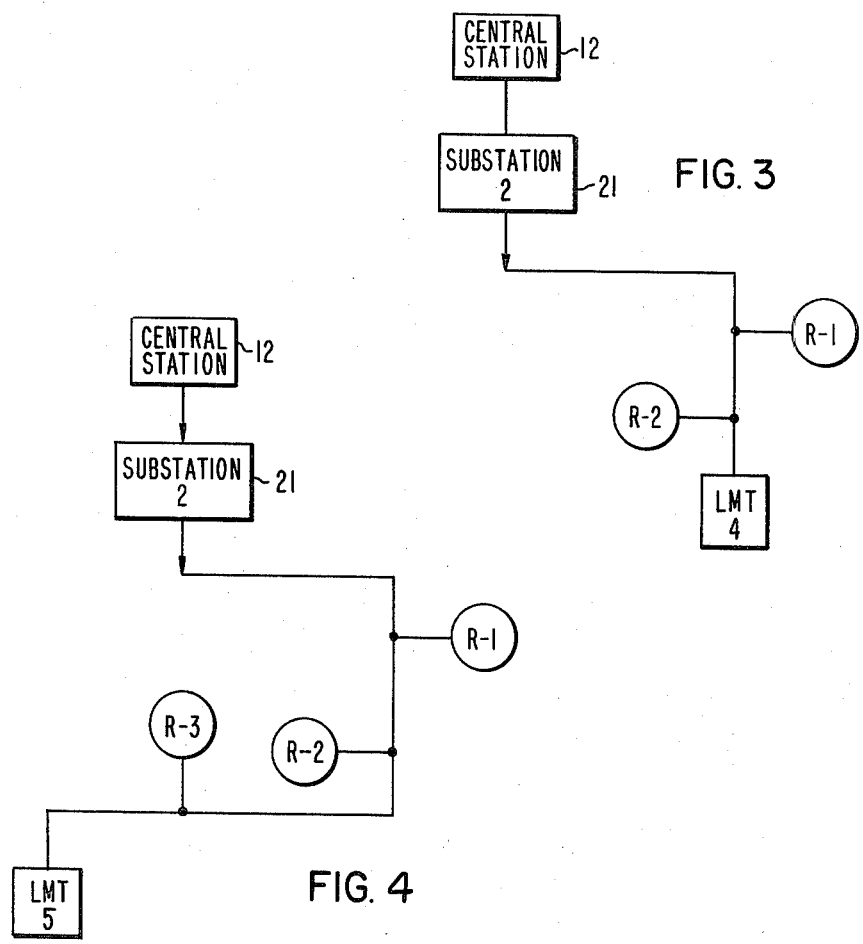
FIG. 3
FIG. 4

DISTRIBUTION NETWORK COMMUNICATION SYSTEM WITH FLEXIBLE MESSAGE ROUTES

BACKGROUND OF THE INVENTION

1. Field of the Invention

This invention is related to network communication systems generally and, more specifically, to distribution network power line communication systems having bidirectionally addressable repeaters for providing bidirectional signal transmissions between a central station and remote devices.

2. Description of the Prior Art

Considerable effort has been devoted in recent years to develop power distribution network carrier communication systems due to the increased desirability of performing certain automated functions, such as the automatic reading of utility meters, selective load control, performing load continuity checks, and the like. However, using the power distribution network as a communication link presents several unique problems not encountered in transmission through paths exclusively intended for communication signals nor in existing high voltage transmission line communication systems. The distribution line, along with the large number of distribution transformers attached thereto, is designed for the transmission of sixty hertz electrical power. The distribution line presents poor and erratically varying high frequency impedance characteristics which rapidly attenuate the communication signals. Additionally, the introduction of electrical noise and signal interference substantially reduces reliability.

U.S. Pat. Nos. 3,967,264; 3,942,168; and 3,911,415, all assigned to the assignee of the present invention, disclose some form of communication system via the distribution network of an electrical utility. U.S. Pat. No. 3,911,415 discloses a power line communication system having signal reconditioning and frequency translating signal repeaters coupled to the conductors of a distribution network. Remote home terminals of different geographical zones are addressable at different frequencies to simplify address coding and isolation of potentially interfering carrier signals.

U.S. Pat. No. 3,967,264 describes a power line communication system which transmits carrier communication signals through addressable repeaters defining communication zones including remote terminals in corresponding geographical zones or subregions. The uniquely addressed repeaters modify segments of the transmitted signal which represent their own address as repeated transmissions are propagated between a central control terminal and uniquely addressed remote terminals. Time delays in the repeater retransmissions avoid interfering signal reception and assure the maintenance of a single repeater in operation during each repeating cycle. Timed waiting is provided by the repeaters for response from the remote terminals. The remote terminal logic is activated without requiring the repeater code. The repeater receivers are always on except during retransmission.

In the carrier communication system disclosed in U.S. Pat. No. 3,942,168, signal repeaters are disposed in signal communication with distribution network power line conductors at each distribution transformer site. In this system, the repeater, in addition to amplifying a signal, provides a bypass circuit for the interrogation and response signals around the associated distribution transformers which present a significant attenuation at the frequencies of the communication signals, especially in the direction from the primary to the secondary winding. The repeaters also include means for delaying a received signal, with the delay time interval selected such that the amplified signal is not applied to the power line at the same time the repeater is to receive another signal. Each repeater includes two channels, each comprised of a receiver, logic and transmitter sections for handling the bidirectional flow of interrogation and response signals between the central communication terminal and the remote communication terminals at the customer sites.

U.S. patent application Ser. No. 956,516, now U.S. Pat. No. 4,250,489, which is assigned to the same assignee as the present invention, discloses a power line carrier communication system having a branch or a pyramid configuration. Bidirectional addressable repeaters include an address recognition and a receive and transmit control logic circuits operated in a timed sequence of operations upon activation by an interrogation message transmitted from a central control terminal via one or more of the repeaters to a predetermined remote location. The branch organization of the repeaters includes groups of repeaters connected to the power line conductors of a distribution network so that each group defines a zone of repeaters. Each repeater zone is associated with remote terminals in geographical areas at progressively further distances from the central control terminal which defines the base or apex of the pyramiding branch configuration of the repeaters.

A first, or zone A, repeater group forms the primary branch paths each extending to a separate group of intermediate branch paths including as many groups of second, or zone B, repeaters as there are primary branch paths. Further branch paths are formed including third, or zone C, repeater groups similarly extending from each of the separate intermediate branch paths. The latter branch paths are the furthest terminal branch paths in one preferred embodiment. Remote communication terminals are coupled in signal communication with the power line conductors for receiving and transmitting signals between an adjacent repeater in any of the zones depending on the correspondingly similar geographic locations of the remote terminals and repeaters with respect to the power lines.

In this prior art communication system, an interrogation message originating at a central control terminal includes repeater address information having groups of repeater addresses in a predetermined segment of data bits in the message format. Each group is associated with a repeater zone and the binary coding of each group is associated with a separate repeater group. Thus, a reduced number of data bits is required and simplified address recognition logic is possible since large numbers of repeaters can have identical repeater addresses but are distinguishable because of their being in a different repeater address group and because of the different repeater address of the preceding repeater address group. False repeater activation is further prevented by each repeater's modification of its own repeater address segment of the retransmitted interrogation message to a predetermined null code such as all zero bits.

A major disadvantage of the prior art power distribution communication systems is that the electric utilities' power distribution systems must be reconfigured so as to fit the required geometry of the communication system. In other words, communication zones, geographical zones, or the like, must be defined so that the electric utilities' power distribution systems will resemble the pyramid-like structure or the matrix-like structure required by the prior art communication systems. This is often a time consuming and expensive task given the fact that power distribution systems have been expanding over several decades without any regard to the needs of a power distribution communication system.

Another major disadvantage of the prior art power distribution communication systems stems from the fact that the distribution network is a very dynamic system, both physically as well as electrically. The system is physically dynamic due to accidents caused by bad weather, vandalism, etc, additions to the system, and other types of construction. The system is electrically dynamic since the utility has the capability, through the closing and opening of switch sets, to completely reroute the flow of electrical power. Thus, a power distribution system which has been reconfigured so as to fit the required geometry of a prior art communication system may require often and extensive revision so as to maintain the required geometry due to the dynamic nature of the system.

The present invention is for a distribution network communication system which requires no specific configuration as required by prior art systems. This represents a considerable savings of time and man-power to the user of the communication system since the communication system is configurable to the existing power distribution network rather than vice versa. This flexibility represents a major advantage of the present invention over the prior art systems.

SUMMARY OF THE INVENTION

The present invention is discussed in conjunction with a power distribution network used by a utility to deliver electrical power to its customers, although the concepts embodied by the present invention need not be limited to this type of distribution network. Each customer location is equipped with a remote terminal which contains a role code identifying the remote terminal as an end device as well as a plurality of address codes. A central station produces an outgoing communication signal. A communication link couples the central station to the power distribution network. A plurality of signal repeaters are used, where needed, to receive, amplify and retransmit the outgoing communication signal. The signal repeaters also contain a preprogrammed, unique address code which allows each repeater to be addressed as an end device. The outgoing communication signal produced by the central station is intended for at least one end device, be it a signal repeater or a remote terminal.

The outgoing communication signal includes a route code identifying a signal path from the central station to the end device the user wishes to communicate with, a role code identifying the first device in the identified route, an address code and a message code. Each of the signal repeaters contains a plurality of stored route codes and role codes which are remotely modifiable. Upon receipt of an outgoing communication signal by a signal repeater, which is not the intended end device, the repeater compares the received route and role codes to the stored route and role codes. If there is a match, the signal repeater removes its role code from the outgoing communication signal and inserts the role code of the next device in the identified route. The modified outgoing communication signal is retransmitted and the signal repeater is prepared, when appropriate, to receive an incoming signal. The modified outgoing communication signal is similarly modified and retransmitted by the other signal repeaters (if any) in the identified route until the message code is received by the end device.

Each remote terminal includes means responsive to the message code for performing various functions such as load shedding, time keeping, meter reading, etc., when the remote terminal is the intended end device. When appropriate, the remote terminal produces an incoming communication signal intended for the central control station. The incoming communication signal includes a role code identifying the next device in the identified route and a response code containing the desired information. No route code is necessary since the signal repeaters in the identified route have been prepared by the outgoing communication signal.

When addressed as an end device, each signal repeater is downloaded with route and role codes by an outgoing communication signal. Downloading is the process by which the remotely modifiable route and role codes stored within the signal repeater are modified so as to allow the repeater to perform a new role in an established route or to perform a new role in a new route. The ability to download the signal repeaters allows the communication system to be easily adapted to the existing distribution network and is considered to be an important feature of the present invention.

BRIEF DESCRIPTION OF THE DRAWINGS

FIG. 2 illustrates that portion of FIG. 1 which comprises the signal path from the automated distribution system central station to the load management terminals within the second substation's communication range;

FIG. 3 illustrates that portion of FIG. 1 which comprises the signal path from the automated distribution system central station to load management terminal number 4; and FIG. 4 illustrates that portion of FIG. 1 which comprises the signal path from the automated distribution system central station to load management terminal number 5.

DESCRIPTION OF THE PREFERRED EMBODIMENT

Figure 1:
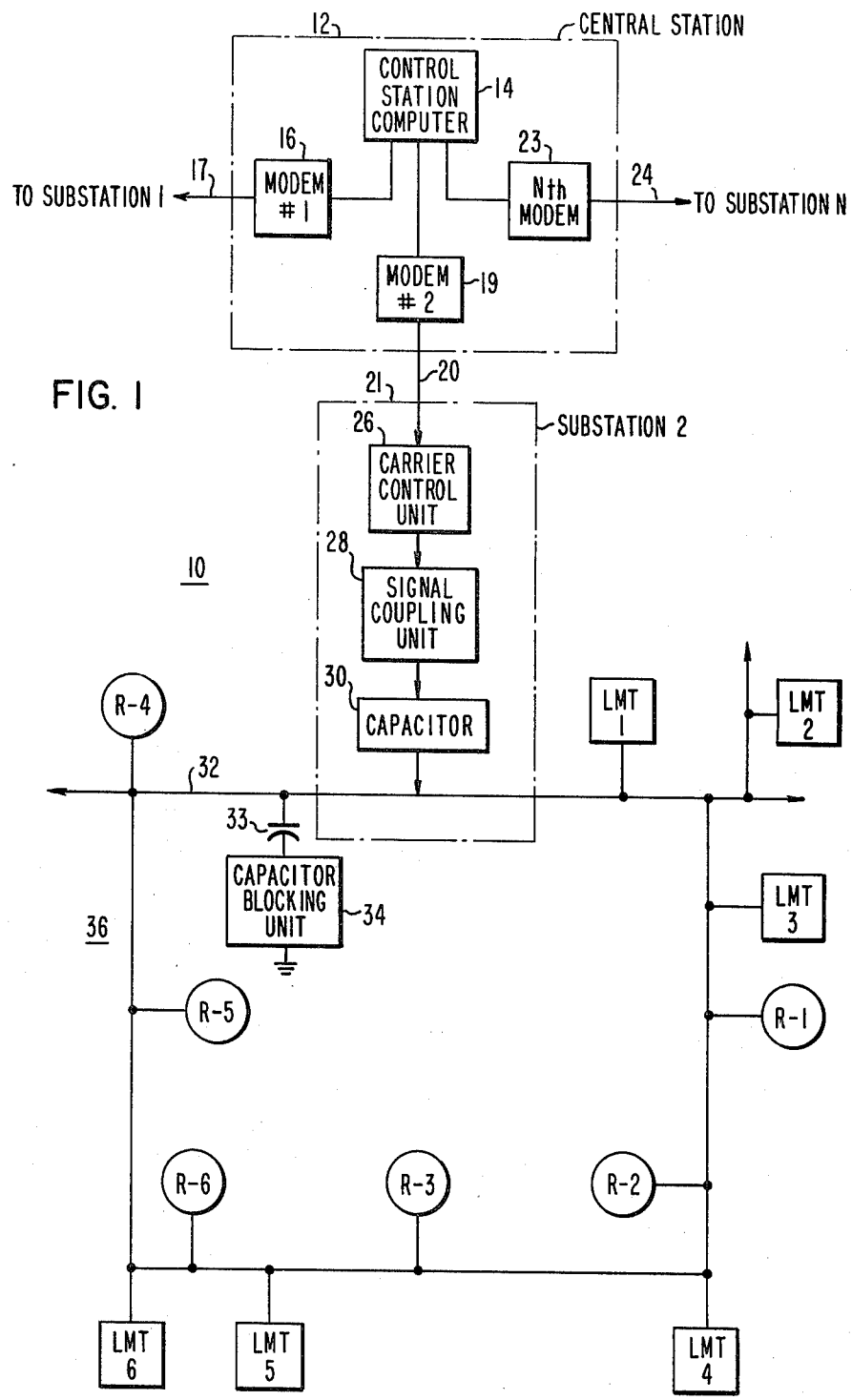
FIG. 1 illustrates a distribution network communication system constructed according to the teachings of the present invention and implemented on a power distribution network.

In FIG. 1 a communication system 10 constructed according to the teachings of the present invention is shown. The communication system 10 is intended to be used in conjunction with a utility's power distribution network, although the concepts need not be limited thereto. An automated distribution system central station 12 is the first device in the communication system 10. The central station 12 contains a central station computer 14 which provides a central control point for both data collection and maintenance of the information required to control the communication system 10. Communication signals generated by the central station computer 14 are considered to be outgoing while communication signals received by the central station computer are considered to be incoming. The central station computer 14 is responsible for generating the outgoing communication signals which contain coded information necessary for the proper operation of the communication system 10. The communication signals produced by the central station computer 14 are delivered to a first substation (not shown), or other signal injection point, through a first modem 16 and a first dedicated phone line 17. Similarly, the communication signals are delivered to a second substation 21 through a second modem 19 and a second dedicated phone line 20 and to an Nth substation (not shown), or other signal injection point, through an Nth modem 23 and an Nth dedicated phone line 24.

The communication equipment located at the second substation 21 is representative of the equipment located at the other signal injection points. The communication equipment located at the second substation 21 includes a carrier control unit 26, a signal coupling unit 28, and a capacitor 30. The carrier control unit acts primarily as a protocol translator, accepting information in a serial character mode from the phone line 20 and translating it into the larger serial word structures that are used on the power line carrier. In the reverse mode, it takes the incoming information returned by the power line carrier and places it back on the phone line 20, with a modified protocol, for return to the central station 12. The signal coupling unit 28 and the capacitor 30 comprise a primary coupling assembly for coupling the carrier control unit 26 to a primary distribution feeder 32. In one embodiment, each carrier control unit 26 may be coupled to up to eight primary distribution feeders through eight individual primary coupling assemblies. The second modem 19, the second dedicated phone line 20, and the communication equipment located at the second substation 21 provide a communication link for coupling the central station computer 14 to the primary distribution feed 32.

A capacitor bank 33 and a capacitor blocking unit 34 are connected between the primary distribution feeder 32 and ground. The capacitor blocking unit 34 serves as a high impedance for the energy of the carrier communication signal thereby preventing the carrier communication energy from being shorted to ground. The remainder of FIG. 1 illustrates the electric utility's power distribution network shown generally by reference numeral 36. The power distribution network 36 is comprised of the primary distribution feed 32, a plurality of secondary distribution feeders, a plurality of signal repeaters and a plurality of customer locations represented by load management terminals (LMT). The reader should recognize that the power distribution network 36 shown in FIG. 1 is greatly simplified and in reality the customer locations serviced by each repeater will number in the hundreds. Also, customer locations may contain any type of remote equipment and need not be limited to LMT's.

In order for the central station computer 14 to communicate with individual LMT's, it is necessary to define a route from the central station computer 14 to the desired LMT. If the LMT is not located within the communication range of the carrier control unit, one or more repeaters must be included in the route. When one or more repeaters are included in the route it is necessary to inform each repeater of the role it is to perform within the predetermined route. Accordingly, the communication signal produced by the central station computer 14 must contain route and role information and each repeater must be capable of recognizing its role within each route in which it participates.

In one embodiment, the outgoing communication signal contains, in addition to other information, a five bit route code and a three bit role code. The five bit route code contained within the communication signal is fixed and does not vary as the communication signal propogates through the power distribution network 36. However, the role code does change as the communication signal propagates through the power distribution network 36 since each device in the route must perform a unique role within that route. A five bit route code allows for the assignment of 32 unique route codes. A three bit role code allows for eight unique role codes. With eight available roles within each route, a route may contain up to seven repeaters and at least one end device.

The actual assignment of route and role codes is totally arbitrary and provides for maximum flexibility when configuring the communication system 10 to the existing configuration of the power distribution network 36. Even though the assignment of route codes and role codes is arbitrary, certain rules must be followed. When a route is established from the central station computer 14 to an LMT, each repeater within that route must be assigned the same route code. Each repeater contains a plurality of stored route codes, which are remotely modifiable, and may participate in as many routes as can be stored in available memory locations. For each route code stored by a repeater a set of remotely modifiable in-detect bits and out-detect bits is also stored. The in-detect bits and out-detect bits are used by the repeater to determine its role within each route of which it is a member.

When a repeater receives an outgoing communication signal, it compares the remotely modifiable route codes and associated out-detect bits to the received route code and role code, respectively. When a match is found the repeater removes its out-detect bits, or role code, from the received communication signal and substitutes its in-detect bits, or new role code. Therefore, for the repeaters within a given route to operate sequentially the out-detect bits of the first repeater must match the received role code of the outgoing communication signal. The in-detect bits inserted into the outgoing communication signal by the first repeater must match the out detect bits of the second repeater in the route. Similarly, the in-detect bits inserted by the second repeater into the modified outgoing communication signal must match the out-detect bits of the third repeater within the route. In this manner, information propagates through a predetermined route.

In summary, the two basic rules for assigning route and role codes are that each device within a route must have the same route number, and the in-detect bits of one device must match the out-detect bits of the device following it within the given route. Several examples using these rules will aid in the understanding of the present invention and will illustrate the ease with which the communication system 10 can be configured to the existing structure of the power distribution network 36.

In FIG. 1, load management terminals number 1, 2 and 3 are within the communication range of the carrier control unit located at the second substation. The signal path from the central station computer 14 to the LMT's is assigned an arbitrary route code of 31 (11111 binary). The LMT's are assigned an arbitrary role code of 7 (111 binary). That portion of FIG. 1 which comprises route 31 (11111) is shown in FIG. 2. The outgoing communication signal produced by the ADS central station 12 shown in FIG. 2 includes the route code 31 (11111) and the role code 7 (111). The role code identifies the first device in the identified route. In this example, the first device in route 31 (11111) is also the last device. Therefore, a communication signal including a role code of 7 (111) is intended for an end device. The route code 31 (11111) has no particular significance in this route since the first device is also the last device and is primarily response to the role code 7 (111). The LMT's 1, 2 and 3 are programmed with the role code 7 (111) so as to be capable of identifying communication signals intended for them. In a real power distribution network, hundreds of LMT's will be responsive to the role code (111). The LMT's are therefore additionally capable of being addressed individually or in groups as will be discussed hereinbelow.

Returning to FIG. 1, a signal path from the central station computer 14 to LMT 4 requires the use of a first repeater R1 and a second repeater R2. This signal path is assigned an arbitrary route code of 3 (00011 binary) and is shown in FIG. 3. The outgoing communication signal produced by the central station 12 must contain the route code 3 (00011) and a three digit role code which matches the out-detect bits of the first repeater R1. Upon receipt of the communication signal, the first repeater R1 will remove its out-detect bits from the communication signal and insert its in-detect bits which define a new role code. For the second repeater R2 to perform its proper role in the route 3 (00011), the in-detect bits inserted in the communication signal by the first repeater R1 must match the out-detect bits of the repeater R2 for the route 3 (00011). Since the next device in the route 3 (00011) after the second repeater R2 is an end device, the role code inserted in the communication signal by the second repeater R2 is 7 (111). The reader will recall that the role code 7 (111) was chosen, in conjunction with route 31 (11111), to represent an end device. For ease of manufacturing and programming, all end devices are therefore programmed to recognize the role code 7 (111). Finally, for the communication signal produced by the central station 12 to be properly relayed to the LMT 4, the repeaters R1 and R2 must each be downloaded (which is discussed in detail hereinbelow) with a set of in-detect bits and out-detect bits for the route 3 (00011). The in-detect bits and out-detect bits may be arbitrarily chosen so long as the in-detect bits of the first repeater R1 match the out-detect bits of the second repeater R2, and the final out-detect bits are 7 (111).

Table I, below, indicates the information downloaded into the repeaters R1 and R2.

TABLE I

| Repeater R1 | Repeater R2 |
| --- | --- |
| route code 00011 | 00011 |
| in-detect 001 | 111 |
| out-detect 010 | 001 |

The signal produced by the central station computer 14 contains the following coded information,

01000011 where the first three bits 010 identify repeater R1's role and the remaining five bits 00011 identify route 3. The signal retransmitted by repeater R1 contains the following coded information,

00100011 where the first three bits 001 identify repeater R2's role and the remaining five bits 00011 identify route 3. The signal retransmitted by repeater R2 contains the following coded information,

11100011 where the first three bits 111 identify the last, or end device, and the remaining five bits 00011 identify route 3.

As can be seen from the above discussion, the role code varies as the communication signal is transmitted through the route, while the route code remains constant. Since one role code is used to designate the role of end devices, up to seven repeaters may be assigned to one route. Because all of the repeaters capable of being assigned to route 3 (00011) have not been used in route 3 (00011), the route 3 (00011) may be used to designate another route provided that different in-detect and out-detect bits are assigned to the individual repeaters. Each repeater may perform one role in as many routes as the repeater has available memory locations. This is illustrated by the following example.

Turning to FIG. 4, that portion of FIG. 1 which comprises the signal path from the central station 12 to LMT 5 is shown. As can be seen in FIG. 4, the repeaters R1 and R2, which are members of route 3 (00011), are also members of the route from the central station 12 to LMT 5. The assignment of an arbitrary route code, in-detect bits and out-detect bits results in the information illustrated in Table II being downloaded into repeaters R1, R2 and R3.

TABLE II

| Repeater R1 | Repeater R2 | Repeater R3 |
| --- | --- | --- |
| route code 01000 | 01000 | 01000 |
| in-detect 010 | 101 | 111 |
| out-detect 011 | 010 | 101 |

The outgoing communication signal contains the following information:
 01101000 when transmitted by the central station 12,
 01001000 when transmitted by repeater R1,
 10101000 when transmitted by repeater R2, and
 11101000 when transmitted by repeater R3.

Returning to FIG. 1, a similar analysis can be made to create a route from the central station 12 to LMT 6. Table III summarizes the information downloaded into repeaters R4 and R5.

TABLE III

| Repeater R4 | Repeater R5 |
| --- | --- |
| route code 10001 | 10001 |
| in-detect 010 | 111 |
| out-detect 011 | 010 |

The outgoing communication signal contains the following information:
 01110001 when transmitted by the central station 12,
 01010001 when transmitted by repeater R4, and
 11110001 when transmitted by repeater R5.

In summary, communication between the central station computer 14 and any user location may be effected by identifying the repeaters, if any, necessary for retransmission of the communication signal, assigning those repeaters a route number, assigning each repeater a role within the route, and downloading the information to each repeater. The communication system disclosed herein provides great flexibility in allowing the communication system to be adapted to the existing structure and configuration of the power distribution network.

Each repeater is preprogrammed with a unique address thereby allowing each repeater to be addressed as an end device. When addressed as an end device the repeater can be downloaded with the necessary route and role codes. In order to download a repeater the central station 12 produces an outgoing communication signal including any necessary route and role codes, the repeater's unique address and the new route codes, in-detect bits and out-detect bits. For example, in FIG. 1, should one of the repeaters R4 or R5 malfunction, or if the power distribution network develops a fault along route 17 (10001), a new route to LMT 6 can be created. The new route to LMT 6 includes repeaters R1, R2, R3 and R6. Each of these repeaters will be individually addressed as an end device and will be downloaded so as to recognize the new route code and the role which it is to perform as a member of this new route. This allows the communication system disclosed herein to perform its intended function in spite of the dynamic characteristics of the power distribution network thus providing a significant advantage not found in prior art systems.

The ability of each repeater to be uniquely addressed as an end device provides an added dimension to the present communication system in that the central station computer 14 can interrogate each repeater to ascertain the stored route codes, in-detect bits and out-detect bits. This information is coded in the response code of an incoming communication signal. With this information the signal paths from the central station 12 to various remote devices can be reconstructed. This ability to "feel" your way through the communication system is valuable in the event that data banks containing routing information are inadvertently lost or destroyed or if emergency rerouting is necessary before the required data banks can be called up and searched.

Each repeater is also capable of being armed by outgoing communication signals so as to expect the receipt of an incoming communication signal. The incoming communication signal may be produced by an LMT or a repeater in response to a received outgoing communication signal. Since the repeaters in the applicable route have been armed so as to expect an incoming communication signal, the incoming communication signal need only contain, in addition to the response code containing the desired information, the necessary role code. This reverse propagation is achieved by having each armed repeater temporarily reverse the in-detect and out-detect bits for the applicable route. The repeaters may also be armed by an outgoing communication signal so as to be prepared for the receipt and retransmission of supplemental outgoing communication signals.

In addition to the coded information carrying the desired message and the route and role codes, it is desirable for the communication signal to contain coded information so as to address individual LMT's or groups of LMT's. This coded information is in the form of a unique address which allows the central station 12 to communicate with an individual LMT or in the form of a block or universal address which allows the ADS central station 12 to communicate with groups of LMT's. Each LMT is preprogrammed with a unique address and at least one block address.

Each of the repeaters and LMT's is equipped with the necessary hardware needed to recognize the type of communication signal and to take appropriate action in response thereto. Specifically, each repeater includes a receiver, logic control circuit, an amplifier and a transmitter. The logic control circuit performs the necessary comparisons, error checks and modifications of the communication signal as well as the arming of the repeater so as to wait for additional communication signals, when appropriate. The logic control circuit also determines when the repeater is being addressed as an end device and manipulates the received data so as to store the downloaded information or direct the production of an incoming communication signal.

Each LMT includes a receiver, logic control circuit and a transmitter. The LMT serves as an interface between the customer location and the power distribution system, and as such includes switches for load control functions and circuits for transferring data to and from the LMT and other devices at the customer location. The logic control circuit performs the necessary comparisons and error checks on the received communication signal. The logic control circuit is responsible for coordinating the response to the received signal. Responses may include receiving an outgoing communication signal including a message code from the central station, sending an incoming communication signal including a response code to the central station, sending or receiving data with other devices at the customer location, load shedding or the like.

The foregoing discussion of the present communication system is made in conjunction with an electric utility's power distribution network. This particular application is intended as an illustration and not a limitation. Those skilled in the art will recognize the flexibility of the communication system disclosed herein and its adaptability to other distribution networks such as a cable television system.

What I claim is:

1. A communication system for a distribution network, comprising:
   a plurality of remote terminals, each containing a plurality of address codes and a role code identifying said remote terminal as an end device;
   a plurality of signal repeaters, said distribution network connecting each of said signal repeaters with certain of said remote terminals, each of said signal repeaters containing a plurality of stored route and role codes and a preprogrammed unique address code identifying said signal repeater as an end device;
   a central station producing an outgoing communication signal intended for a predetermined end device, said outgoing communication signal including a route code identifying a signal path to said predetermined end device, a role code identifying the first device in said identified route, an address code and a message code; and
   a communication link coupling said central station to said distribution network;
   each of said signal repeaters includes means for receiving said outgoing communication signal, means for comparing the received address code to said preprogrammed unique address code, and means being responsive to said message code in response to said comparison of the received address code to the preprogrammed address code, and includes means for comparing said received route and role codes to said stored route and role codes, means for removing its role code from the outgoing communication signal and inserting the role code of the next device in said identified route in response to said comparison of the received route and role codes to the stored route and role codes, and means for retransmitting the modified outgoing communication signal such that said message code is ultimately received by said predetermined end device, each of said remote terminals includes means for comparing the received role code and address code to its role code and its plurality of address codes, and means being responsive to said message code in response to said comparison of the received role code and address code to the stored role code and plurality of address codes.

2. The system of claim 1 wherein the address code of the outgoing communication signal includes a preprogrammed unique address code identifying a signal repeater as the predetermined end device and wherein the message code includes new route and role codes to be stored in the end device repeater.

3. The system of claim 2 wherein the signal repeater means responsive to the message code includes means for storing said new route and role codes.

4. The system of claim 1 wherein the signal repeater means responsive to the message code includes means for producing an incoming communication signal intended for the central station, said incoming communication signal including the role code identifying the next device in the identified route and a listing of the stored route and role codes.

5. The system of claim 1 wherein the remote terminal means responsive to the message code includes means for producing an incoming communication signal intended for the central station, said incoming communication signal including the role code identifying the next device in the identified route and a response code.

6. The system of claim 4 or claim 5 wherein the signal repeaters include means for preparing said signal repeaters in response to certain of the outgoing communication signals for the receipt of the incoming signals.

7. The system of claim 6 wherein the central station produces supplemental outgoing communication signals, and wherein the means for preparing the signal repeaters prepares said signal repeaters in response to certain of the outgoing communication signals for the receipt of said supplemental outgoing communication signals.

8. The system of claim 1 wherein the address code of the outgoing communication signal includes one of the plurality of address codes such that the central station communicates with certain groups of the remote terminals serviced by the same signal repeater.

9. The system of claim 8 wherein the plurality of address codes includes a unique address code such that the central station communicates with individual ones of the remote terminals.

10. The system of claim 1 wherein the role codes include a set of in-detect and out-detect bits for each route code, and wherein a signal repeater compares the received role code to its out-detect bits, and removes the role code from the outgoing communication signal and inserts its in-detect bits in response to said comparison of the received role code to the repeater's out-detect bits.

11. The system of claim 1 wherein the distribution network includes an electric power distribution network.

* * * * *